June 7, 1938.  R. BERNHARDT  2,120,170
CONTAINER AND CLOSURE THEREFOR
Filed Oct. 6, 1937
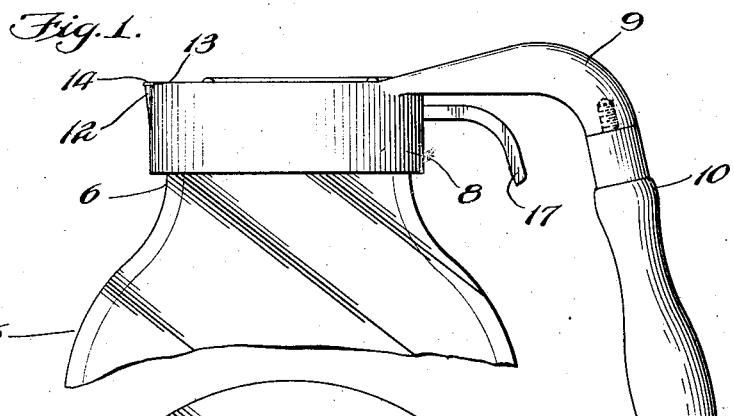
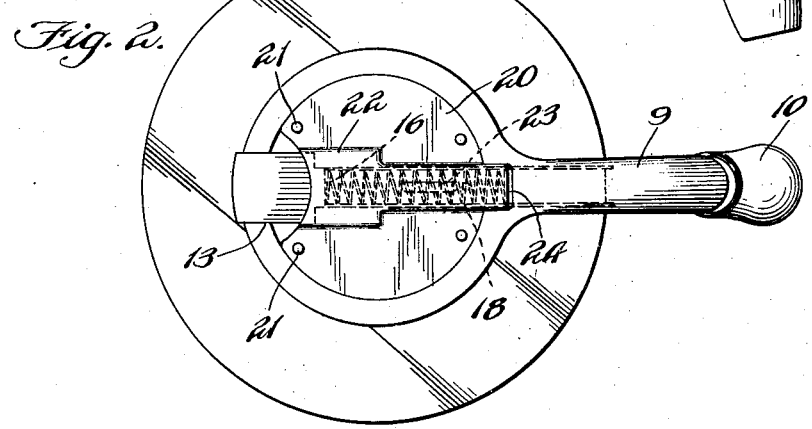
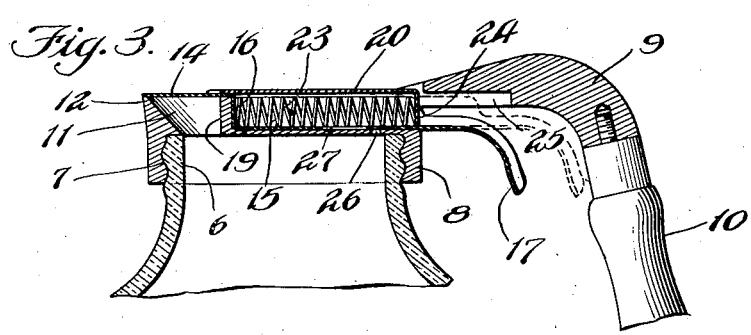
Inventor
Rudolph Bernhardt
By Glenn S. Noble
Atty.

Patented June 7, 1938

2,120,170

UNITED STATES PATENT OFFICE 2,120,170

CONTAINER AND CLOSURE THEREFOR

Rudolph Bernhardt, Chicago, Ill.

Application October 6, 1937, Serial No. 167,549

4 Claims. (Cl. 215—100)

This invention relates to containers for holding and dispensing various substances and is particularly intended for use with viscous liquids such as honey, molasses, oil, or the like.

The objects of the invention are to provide a simple and efficient closure or cap having a pouring spout and means for cutting off the liquid to prevent the same from dripping or running down the sides of the container; to provide a pouring spout for a container which will be simple in construction and particularly efficient and durable in operation; and to provide such other novel features and advantages as will appear more fully from the following description.

In the accompanying drawing illustrating this invention,

Figure 1 is a side view showing a portion of the pitcher or container with the closure applied thereto;

Figure 2 is a plan view of the same;

Figure 3 is a sectional view; and

Figure 4 is a perspective detail of the closure and cut-off slide.

The container 5 represents any ordinary or preferred device of this character such as a syrup pitcher or the like, and has a neck portion 6 with means such as threads 7 for engagement by the threaded portion of the cap or closure 8. This closure may be made of any suitable material such as one of the phenol condensation products and has an outwardly extending handle portion 9 which is engaged by a detachable handle 10 or which may be extended if desired to form a handle of one piece. The cap or closure 8 has a pouring spout 11 preferably on the side opposite from the handle with a slightly projecting lip 12 as shown. The top of the pouring spout has a shallow channel or guideway 13 which is engaged by a closing slide or blade 14 which forms a cover for the nozzle and also serves to cut off the liquid which is being dispensed from the container. The blade 14 is formed integrally with a channel shaped carrier and operating member 15 as shown in Figure 4. This member has an abutment or wall 16 at one end and a handle 17 at the opposite end. The carrier 15 is slidably mounted in a groove or guideway 18 in the closure 8, which groove is in alignment with the pouring spout 11 as readily seen from Figure 2. The end or wall 16 engages with the wall or abutment 19 at the end of the slot 18, which wall also forms the rear of the pouring spout 11. The slide or carrier 15 with the projecting blade 14 is held in operative position by a disc or plate 20 which may be secured to the closure 8 by rivets or the like 21. This cover plate has a raised portion 22 for receiving the blade 13 when it is in retracted position. A spring 23 has one end engaging with the wall or abutment 16 and the opposite end engaging with a tongue or projection 24 that extends downwardly from the disc 20 into the channel portion of the slide 15. The handle member 9 is preferably recessed or cut away as shown at 25 to provide clearance for the slide when the nozzle is opened.

The closure member 8 has a vent hole 26 at one side which registers with a slot or opening 27 in the bottom of the slide 15 when the spout is opened to provide a passageway for the inlet of air when the contents of the pitcher are being poured out.

When the liquid is to be poured out of the pitcher the user grasps the handle 10 and draws the slide 15 to open position by means of the finger piece or projection 17 which acts against the tension of the spring 23 and opens the spout 11. During this pouring operation, air may enter the container through the slot 27 and hole 26. When sufficient quantity has been poured out the finger piece or handle 17 is released which causes the blade 14 to slide over the nozzle and cover the same and to also cut off the stream or any portion of liquid emerging from the spout. The spring 23 which causes the closing movement has sufficient tension to hold the closing members securely in position and the bottom of the slide or carrier 15 also closes the hole 26 when in normal position so that the device completely closes the container. The arrangement is such that the wall 19 will tend to scrape or clean the closing blade and there will be little tendency toward clogging or contamination of the moving parts. However if necessary the closure may be readily cleaned by soaking in hot water and if desired the disc 20 may be removably attached so that the parts can be disassembled for washing. The device may be used as a more or less permanent closure, as for shipping purposes, by inserting a disc between the cap and the top of the container in the ordinary manner.

While I have shown a preferred form of my invention it may be desirable to change the form or shape thereof for employment on different types of containers and therefore I do not wish to have the claims limited to the particular construction shown except as set forth in the following claims.

I claim:

1. The combination with a container, of a cap having a pouring spout at one side thereof and having a guideway at the top of the spout, a closure blade engaging with the guideway to close the spout, a channel in the cap which aligns with the guideway, a slide mounted in the channel and connected with the blade, said slide having a finger piece projecting from one end thereof, a plate secured to the cap and covering said channel, a spring coacting with the plate and slide for moving the blade to closing position, and a handle on the cap arranged adjacent to the finger piece.

2. The combination with a pitcher, of a combined closure and dispenser comprising a cap engaging with the container and having a pouring spout, a handle disposed on the side opposite from the pouring spout, a guideway in the cap having an end wall forming a part of the spout, a channel-shaped slide mounted in the guideway and having an end wall which engages with the first-named wall when in closing position, a closing member formed integrally with the slide and extending over the spout to close the same, a finger piece on the opposite end of the slide, a disc secured to the cap and covering the guideway, an abutment extending inwardly from the disc, a spring between the abutment and the end wall of the slide for holding the device in closing position, an air vent hole in the cap which is closed by the slide when in normal position, said slide having an opening which registers with the hole when the closure is in open or pouring position.

3. A combined closure and dispenser for a container comprising a body portion for engagement with the outlet of the container and having a pouring spout at one side thereof, a handle projecting from the opposite side of the body portion, a guideway in the body portion, a slide mounted in the guideway and having a finger-piece extending toward the handle, a closing member formed integrally with the slide and extending over the spout when in closing position, a cover plate secured to the body portion and having an inwardly extending projection, a spring interposed between the projection and the slide for actuating the slide, and an air vent coacting with the slide.

4. A combined closure and dispenser for a container, comprising a body portion for engagement with the outlet of the container, having a pouring spout at one side thereof, a handle projecting from the opposite side of the body portion, a guideway in the body portion, a closure member for the spout comprising a channel closed at one end and having an outwardly projecting, integrally formed closing blade, the opposite end of the channel having an integrally formed finger piece positioned adjacent to the handle, said channel being mounted in said guideway, means for holding the channel in the guideway, and means tending to actuate the channel to move the blade to closing position.

RUDOLPH BERNHARDT.